(12) United States Patent
Metzger et al.

(10) Patent No.: US 12,337,798 B2
(45) Date of Patent: Jun. 24, 2025

(54) MOTOR VEHICLE

(71) Applicant: Dr. Ing. h.c. F. Porsche Aktiengesellschaft, Stuttgart (DE)

(72) Inventors: Margret Metzger, Markgröningen (DE); Uwe Schwitzgäbel, Wurmberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 177 days.

(21) Appl. No.: 18/197,163

(22) Filed: May 15, 2023

(65) Prior Publication Data
US 2023/0373400 A1 Nov. 23, 2023

(30) Foreign Application Priority Data

May 20, 2022 (DE) ..................... 10 2022 112 717.6
Mar. 3, 2023 (DE) ..................... 10 2023 105 295.0

(51) Int. Cl.
*B60R 5/04* (2006.01)

(52) U.S. Cl.
CPC ..................... *B60R 5/045* (2013.01)

(58) Field of Classification Search
USPC .......................... 296/37.16; 224/275; 108/44
See application file for complete search history.

(56) References Cited

U.S. PATENT DOCUMENTS

| | | | |
|---|---|---|---|
| 3,747,975 A * | 7/1973 | McGregor | A47C 7/70 292/202 |
| 9,428,113 B2 | 8/2016 | Govardhan et al. | |
| 9,676,339 B2 | 6/2017 | Huebner et al. | |
| 10,112,360 B2 * | 10/2018 | Casagrande | G06F 1/1626 |
| 10,688,934 B2 | 6/2020 | Fleischhacker | |
| 10,716,410 B2 * | 7/2020 | Iizumi | A47D 5/006 |
| 10,787,128 B2 | 9/2020 | Ngo | |
| 11,458,903 B2 * | 10/2022 | Anaya | B60R 5/04 |
| 2009/0108639 A1 * | 4/2009 | Sturt | B60N 2/36 297/15 |
| 2016/0288723 A1 * | 10/2016 | Woodhouse | B60R 7/043 |

FOREIGN PATENT DOCUMENTS

| | | |
|---|---|---|
| DE | 19745152 C1 | 9/1999 |
| DE | 202005009428 U1 | 9/2005 |
| DE | 102007049111 A1 | 4/2009 |

(Continued)

*Primary Examiner* — Joseph D. Pape
(74) *Attorney, Agent, or Firm* — Buchanan Ingersoll & Rooney PC (57) ABSTRACT

A motor vehicle has a rear seat bench, a storage compartment arranged behind the rear seat bench in the direction of travel, and a storage compartment floor. A hat shelf is positionable behind the rear seat bench in a usage position such that it separates a passenger compartment from the storage compartment. In order to thereby provide an easily actuatable hat shelf which is also sturdy when in its non-usage position in the motor vehicle, a gap is provided between the rear seat bench and the storage compartment floor. The hat shelf and the gap interact such that the hat shelf can be inserted into the gap in a non-usage position and can be fixed to the rear seat bench via a fixation device such that, in its non-usage position, the hat shelf adjoins a rear side of the rear seat bench.

8 Claims, 7 Drawing Sheets

(56) References Cited

FOREIGN PATENT DOCUMENTS

| | | |
|---|---|---|
| DE | 102015104589 A1 | 10/2015 |
| DE | 102016104903 A1 | 10/2016 |
| DE | 102016208551 A1 | 11/2017 |
| DE | 202016106656 U1 | 3/2018 |
| DE | 202018104184 U1 | 7/2018 |
| DE | 102017109527 A1 | 11/2018 |
| DE | 102019126536 A1 | 4/2020 |
| FR | 2863230 A1 | 6/2005 |

\* cited by examiner

MOTOR VEHICLE

CROSS-REFERENCE TO RELATED APPLICATION

This application claims priority to German Patent Application No. 10 2022 112 717.6, filed May 20, 2022 and German Patent Application No. 10 2023 105 295.0, filed Mar. 3, 3022, the content of such applications being incorporated by reference herein in their entirety.

FIELD OF THE INVENTION

The present invention relates to a motor vehicle having a rear seat bench and, arranged behind the rear seat bench in the direction of travel, a storage compartment having a storage compartment floor.

BACKGROUND OF THE INVENTION

DE 10 2015 104 589 A1, which is incorporated by reference herein, discloses a motor vehicle of said type having a rear seat bench and, arranged behind the rear seat bench in the direction of travel, a storage compartment floor as well a hat shelf, which is positionable behind the rear seat bench in a usage position such that it separates a passenger space from the storage compartment then arranged beneath. The hat shelf is adjustable or rotatable between a usage position and a non-usage position.

Known from DE 10 2007 049 111 A1, which is incorporated by reference herein, is a cover device for a storage compartment of a motor vehicle, comprising a laminar cover adjustable from a stowed position in which the storage compartment is at least partially accessible to a user and a covered position in which the storage compartment is at least partially covered. Holding means are provided in this context, which can keep the storage compartment cover in the covered position.

Known from DE 10 2017 109 527 A1, which is incorporated by reference herein, is a storage compartment arrangement for a motor vehicle with a foldable storage compartment cover and a guide system for guiding the storage compartment cover between a covered position and an accordion-like folded position. Also provided is a locking means for locking the storage compartment cover at a height vertically spaced from the guide system, wherein the guide system is designed to decouple the storage compartment cover from the guide system in the folded position and the locking means for pivoting the storage compartment cover from the folded position to a stowed position. The latter can also cover bulky goods stored in the storage compartment that can be rotatably connected to the locking means in the folding position and can be detached from the guide system and can more easily secure against sliding.

Known from DE 20 2005 009 428 U1, which is incorporated by reference herein, is an interior cover for a passenger vehicle having a component designed as a housing, in which insertion parts are accepted in an axially movable and/or resilient manner. The interior cover is in this case designed to be mountable in the vehicle interior such that a storage compartment is coverable, and a gap opening between the seat back of the rear seats or the individual seat backs and the interior cover when the rear side of the rear seat is adjusted is self-actuating or manually closable by means of the insertion parts.

Known from DE 197 45 152 C1, which is incorporated by reference herein, is a hat rack device with a flexible cover, which is connected to several locking means. Two of these latch means are irremovably connected to the cover, while two further latch means are hinged in the vehicle body. The locking means provided in the vehicle are in two pieces so that the cover can either be pivoted up as a whole about an axle near the rear side of the rear seat backrest, or only a portion of the cover can be pivoted upwards to enable separate access from the rear seat.

Known from DE 10 2016 104 903 A1, which is incorporated by reference herein, is a storage system for a motor vehicle comprising a floor plate and a storage compartment located over the floor plate along with a movable storage compartment cover. The storage compartment cover is adjustable between a usage position and a non-usage position, wherein it rests in a storage compartment below the storage compartment floor when in its non-usage position.

One disadvantage of the hat shelf heretofore adjustable between a usage position and a non-usage position is the complex stowing process into the non-usage position, particularly insofar as the motor vehicle, e.g., has a hatchback or is designed as a coupe.

SUMMARY OF THE INVENTION

The present invention relates to the general idea of arranging and fixing a hat shelf, which is adjustable between a usage position and a non-usage position, in its non-usage position simply parallel to a rear side of a rear seat bench of the motor vehicle, wherein a gap existing between a storage compartment floor and the rear seat bench is used for fixation. In this context, the motor vehicle according to aspects of the invention comprises a rear seat bench and a rear storage compartment having the aforementioned storage compartment floor. The rear seat bench can be designed in a divisible or indivisible manner, or it can also comprise individual rear seats. Also provided is a hat shelf positionable in a usage position behind the rear seat bench such that it separates a passenger compartment from the storage compartment then arranged beneath. According to the present invention, a predefined gap is provided between the rear seat bench and the storage compartment floor, wherein the hat shelf and this gap interact such that an edge of the hat shelf can be inserted into the gap when the hat shelf is in its non-usage position and can additionally be fixed to the rear seat bench via a fixation device, so that it adjoins a rear of the rear seat when the hat shelf is in its non-usage position. In this context, a gap width essentially corresponds to a thickness of the hat shelf, whereby a lower edge of the hat shelf can be stored and fixed in the gap, which is nearly clearance-free. The fixation device, which can, e.g., be designed as a simple elastic band, enables a comparatively simple and fast biasing of the hat shelf against the rear side of the rear seat bench and thus a locking of the hat shelf in its non-usage position. The gap provided between the rear seat bench and the storage compartment floor for fixing the rear hat shelf according to aspects of the invention enables a comparatively simple, form-fitting fixation of the lower edge of the hat shelf when in its non-usage position, whereas only an easy fixation or biasing of the upper edge against the rear side of the rear seat bench need to performed by the fixation device. Overall, the hat shelf can thus be adjusted from its usage position into its non-usage position and vice versa comparatively simply, even from the passenger compartment.

In an advantageous further development of the motor vehicle according to aspects of the invention, receptacles are provided at the rear side of the rear seat bench, wherein hinge elements are provided on the hat shelf, which hinge elements are insertable into the associated receptacles such that the hat shelf is rotatable relative to the rear seat bench about the hinge elements/hinge bolts. The result enables, e.g., a pivotal coupling of the hat shelf to the rear seat bench by the edge of the hat shelf facing away from the rear seat being, e.g., connectable to a rear hatch so that, when the rear hatch is opened, the hat shelf is likewise pivoted upwards, and the storage compartment arranged beneath is thereby exposed. The result ensures a particularly easy accessibility of the storage compartment from the rear when the rear hatch is open.

The hinge elements advantageously form a stop when the hat shelf is inserted in the gap. In order to be able to achieve a predefined non-usage position, the hinge elements can form a stop that prevents further insertion of the hat shelf into the gap. The hinge elements are arranged such that the hat shelf can be inserted deep into the gap such that it can be reliably fixed there in its non-usage position. The hinge elements can thus perform two functions, i.e., a pivotable support of the hat shelf on the rear seat bench on the one hand and, on the other hand, a haptic feedback when inserting the hat shelf into the gap.

In a further advantageous embodiment of the motor vehicle according to aspects of the invention, the fixation device comprises an elastic band having a first fixation element and a second fixation element, the longitudinal ends of which are attached to the band. In this case, the first fixing element and the second fixing element are fixable or firmly fixed to the hat shelf, while the elastic band wraps around a head support of the rear seat bench and thereby biases the hat shelf against the rear of the rear seat bench when the hat shelf is in its non-usage position. For example, the respective longitudinal ends of the resilient band can be firmly connected to the hat shelf, in particular a bottom side thereof and, when the hat shelf is inserted into the gap, the band can be tensioned and looped around, e.g., a head support. In its usage position, the elastic band is biased to a bottom side of the hat shelf and is thereby not arranged in a visible manner. Attaching the elastic band to the underside of the hat shelf can, e.g., be fixable by sewing, gluing, but also by releasable fixation elements, e.g., by snaps on the hat shelf that can be fastened to the corresponding connectors arranged on the underside. Of course, corresponding hooks, e.g. plastic hooks, are also conceivable.

In a further advantageous embodiment of the solution according to aspects of the invention, the fixation device comprises an elastic band having a first fixation element and a second fixation element, the longitudinal ends of which are attached to the band, wherein the first fixing element is fixable or firmly fixed to the hat shelf, while the second fixation element is connected to a rod of a head rest in the non-usage position of the hat shelf and thereby biases the hat shelf against the rear of the rear seat bench when the hat shelf is in its non-usage position. It is also conceivable in this case that attachment of the elastic band to the hat shelf is either fixed, i.e., via a bond or a seam, or by means of a snap button, i.e. releasable. The second fixing element can also be designed as, e.g., a snap button or a hook, wherein a hook made of plastic enables comparatively simple attachment by simply hanging on the rod of the head support.

The rear side of the rear seat bench of the motor vehicle is preferably provided with lashing rings, wherein the fixation device comprises a retaining contour, which is connectable to the lashing ring on the one hand and the hat shelf on the other hand, thereby retaining the latter on the rear side of the rear seat bench when the hat shelf is in its non-usage position.

In this case, fixing the hat shelf in its non-usage position is readily possible using the lashing rings provided on the rear side of the rear seat bench. The retaining contour can, for example, also be a clip element or a hook element, e.g., made of plastic, which wraps around an edge of the hat shelf.

In a further advantageous embodiment, the fixation device comprises a magnetic element and a ferromagnetic element, which elements can be provided on either the hat shelf or on the rear seat bench. The magnetic element and the (metallic) ferromagnetic element may either be mounted separately or integrated into the hat shelf, or rather into the rear side of the rear seat bench. Such a magnetic fastener can be used to make it extremely simple and wear-free to fix the hat shelf to the rear seat bench, as well as to release it.

The fixation device can in particular additionally or alternatively also comprise a flexible snap fastener band or a hook and loop fastener. The arrangement using the hook and loop fastener can be designed either with fleece tape on the hat shelf and a hooking tape on the rear seat bench, or vice versa. A snap fastener band is a releasable, audible snap-fit fastening system. In general, however, by way of the snap fastener as well as the hook and loop fastener, a fixation of the hat shelf to the rear seat bench can be designed in a quite straightforward manner.

Further important features and advantages of the invention follow from the dependent claims, the drawings, and the accompanying description of the figures with reference to the drawings.

It is understood that the features specified hereinabove and those yet to be explained hereinafter can be used not only in the respectively specified combination, but also in other combinations or on their own, without leaving the scope of the invention.

Preferred embodiment examples of the invention are set forth in the drawings and will be explained in greater detail in the description hereinafter, wherein identical reference numbers refer to identical, similar, or functionally identical components.

BRIEF DESCRIPTION OF THE DRAWINGS

The following are shown schematically.

DETAILED DESCRIPTION OF THE INVENTION

According to FIGS. 1 to 13, a motor vehicle 1 according to aspects of the invention comprises a rear seat bench 2 as well as a storage compartment 4 with a storage compartment floor 5 arranged behind the rear seat bench in the direction of travel 3. Also provided is a hat shelf 6 or generally a storage compartment cover, which is positionable in a usage position (not shown) behind the rear seat bench 2 such that it separates a passenger compartment 7 from the storage compartment 4. A gap 8 is provided between the rear seat bench 2 and the storage compartment floor 5, which is removable or at least liftable, e.g., in order to enable access to a storage compartment optionally arranged beneath. According to the present invention, the hat shelf 6 and/or generally the storage compartment cover and the gap 8 are then coordinated regarding their geometric dimensions or orientations with respect to each other such that the hat shelf 6 can be inserted into the gap 8 in a non-usage position and can be fixed to the rear seat bench 2 via a fixation device 9, such that it adjoins a rear side 10 of the rear seat bench 2 when the hat shelf is in its non-usage position. The great advantage thereby is that the hat shelf 6 is comparatively simple, e.g., adjustable from the passenger compartment 7 from its usage position into its non-usage position and, at the same time, designed to be extremely simple in construction, e.g., as a simple plate.

Receptacles 11 (see FIGS. 1, 9, and 10) can be provided on the rear side 10 of the rear seat bench 2, wherein hinge elements 12 are provided on the hat shelf 6, which elements can be inserted into the associated receptacle 11 such that the hat shelf 6 is rotatable about the hinge elements 12 relative to the rear seat bench 2 when the hat shelf is in its usage position. Looking more closely at FIGS. 1, 6, 9, and 10, it can in this context be seen that the hinge elements 12, e.g. hinge bolts, simultaneously form a stopper for the hat shelf 6 in its non-usage position, i.e., when the hat shelf is inserted into the gap 8. The hinge elements 12 thus enable simple insertion of the hat shelf 6 into the gap 8, wherein a plug-in end position is reliably effected by the hinge elements 12 acting as stop elements. This also provides a user with haptic feedback when reaching the insertion end position. In addition, two functions can be assigned to the hinge elements 12.

In general, the fixation device 9 can comprise an elastic band 13 with a first fixation element 14 and a second fixation element 15, each of the longitudinal ends of which is attached to the elastic band 13 (see in particular FIGS. 2 to 10). In the embodiment shown in FIGS. 2 to 4, the first fixation element 14 and the second fixation element 15 are fixable or firmly fixed to the hat shelf 6 (or generally a storage compartment cover), while the elastic band 13 wraps around a head support 16 of the rear seat bench 2 and thereby biases the hat shelf 6 against the rear side 10 of the rear seat bench 2 when the hat shelf is in its non-usage position (see also FIGS. 7 to 10). At least one fixing element 14, 15 can in this case be designed as a hook 17 (see FIGS. 2 to 6) or as a snap 18 (see FIGS. 7 to 10).

It is alternatively conceivable that the fixation device 9 comprising the elastic band 13 and the two fixation elements 14, 15, the longitudinal ends of which are attached to the elastic band 13, be fixable or firmly fixed to the hat shelf 6 via its first fixation element 14, e.g. the hook 17, while the second fixation element 15 is connected to an unspecified rod of the head support 16 and thereby biases the hat shelf 6 against the rear side 10 of the rear seat bench 2 when the hat shelf is in its non-usage position. This is the case, for example, in the embodiment shown in FIG. 5.

Figure 1:
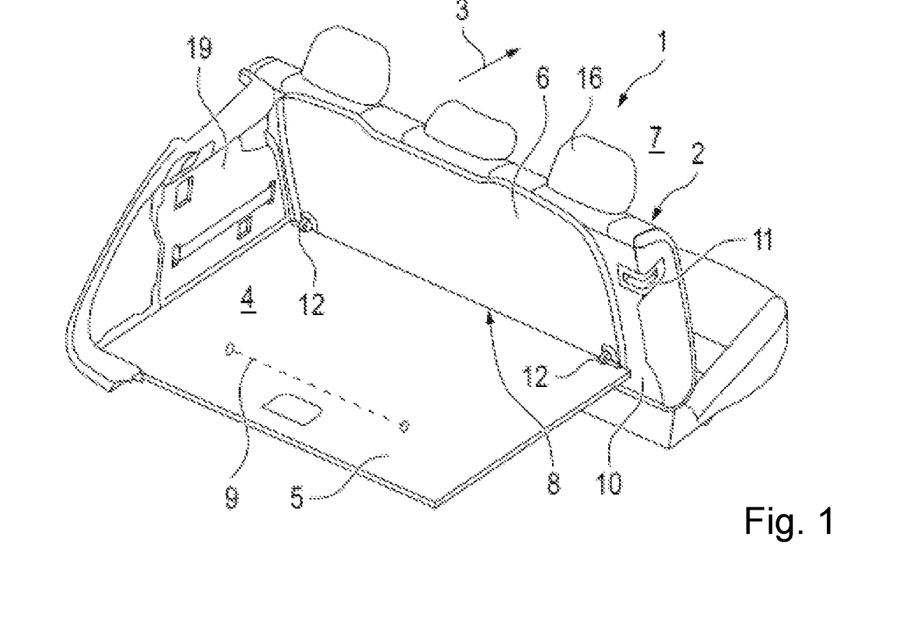
FIG. 1 a rear view of a motor vehicle according to aspects of the invention in the area of a storage compartment and a rear seat bench comprising a hat shelf disposed in its non-usage position, FIG. 2 a detailed illustration of FIG. 1, with a fixation device for fixing the hat shelf in its non-usage position, FIG. 3 a sectional view through the rear seat bench and the hat shelf in the area of the fixation device, FIG. 4 one possible embodiment of a fixation device in a state arranged at a bottom of the hat shelf, FIG. 5 a further possible embodiment of the fixation device for fixing the hat shelf in the non-usage position, FIG. 6 one possible arrangement of the fixation device in its non-usage position on a side wall of the storage compartment, FIG. 7 another possible embodiment of a fixation device with snaps, FIG. 8 a sectional view through the fixation device shown in FIG. 7, FIG. 9 a further possible embodiment of a fixation device for fixing the hat shelf in its non-usage position, FIG. 10 a representation as in FIG. 9, but with the fixation device located in its non-usage position, FIG. 11 a fixation device designed as a retaining contour for fixing the hat shelf in its non-usage position on a lashing ring of the rear seat bench, FIG. 12 a fixation device designed to have a magnetic element and a ferromagnetic element for fixing the hat shelf to the rear seat bench, FIG. 13 a snap fastener tape or a fixation device designed as a hook-and-loop fastener for fixing the hat shelf to the rear seat bench.
Figure 2:
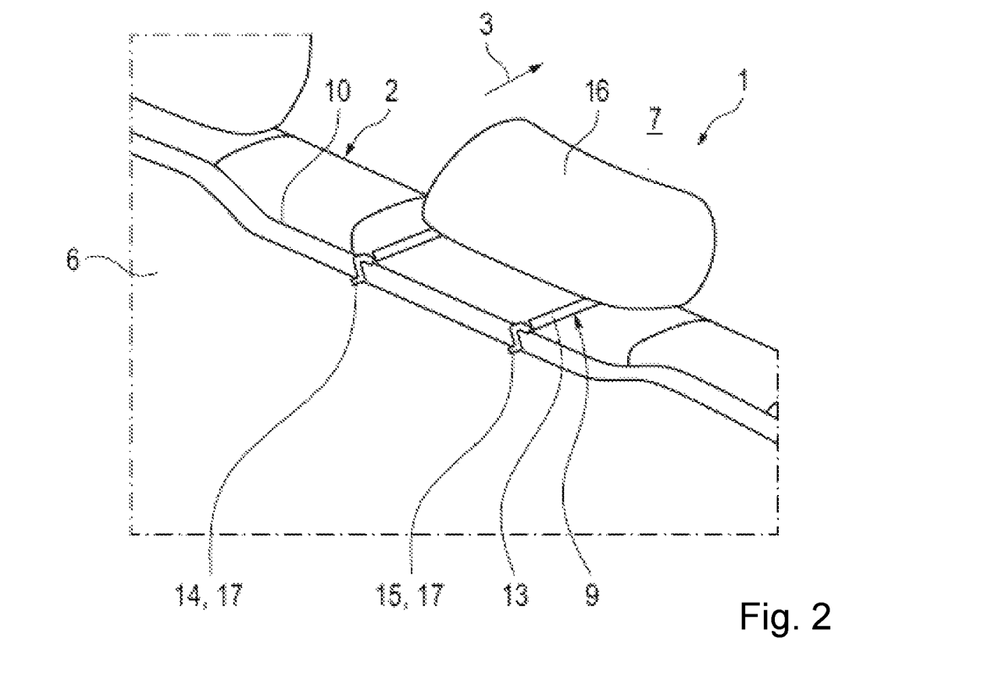
Figure 3:
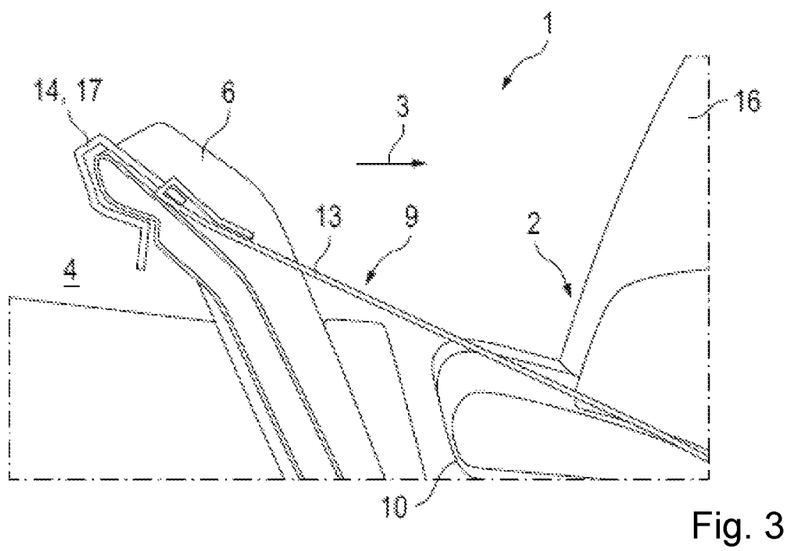
Figure 4:
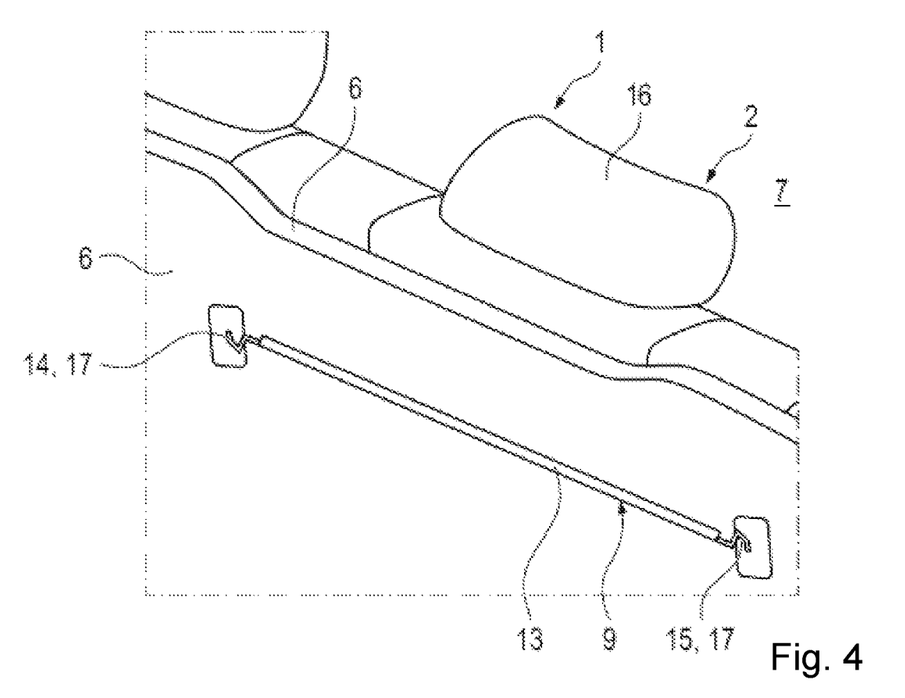
Figure 5:
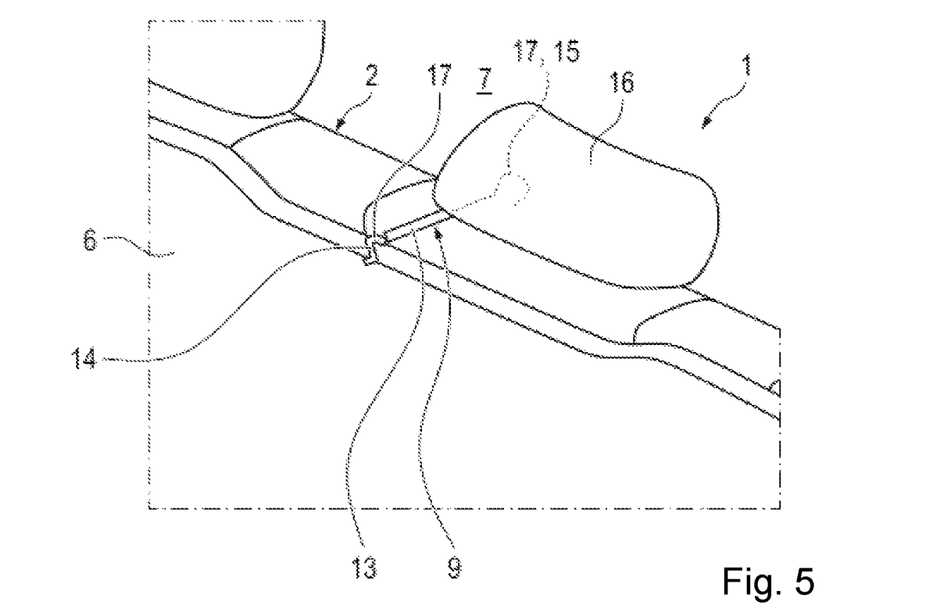
Figure 6:
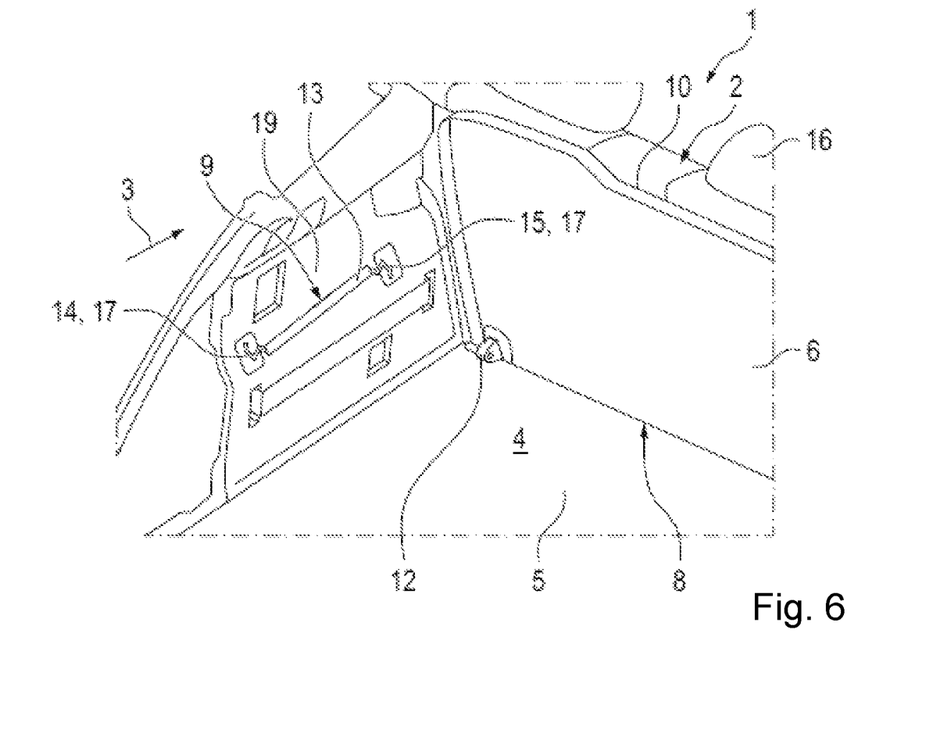
Figure 7:
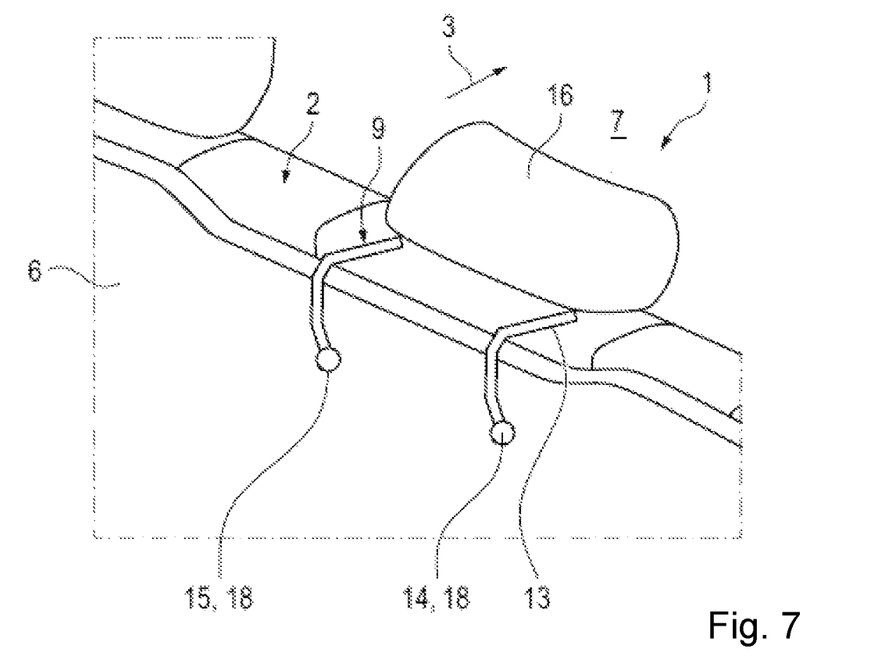
Figure 8:
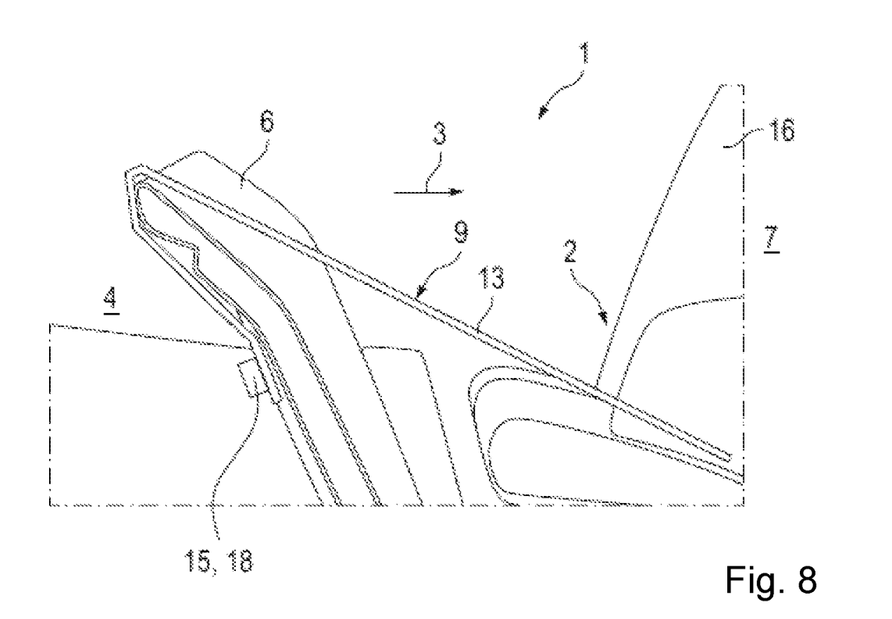

In its non-usage position, the fixation device 9 can be fixed to a bottom side of the hat shelf 6 (see FIGS. 4, 9, and 10) or to a side wall 19 of the storage compartment 4, as shown in FIG. 6.

Figure 11:
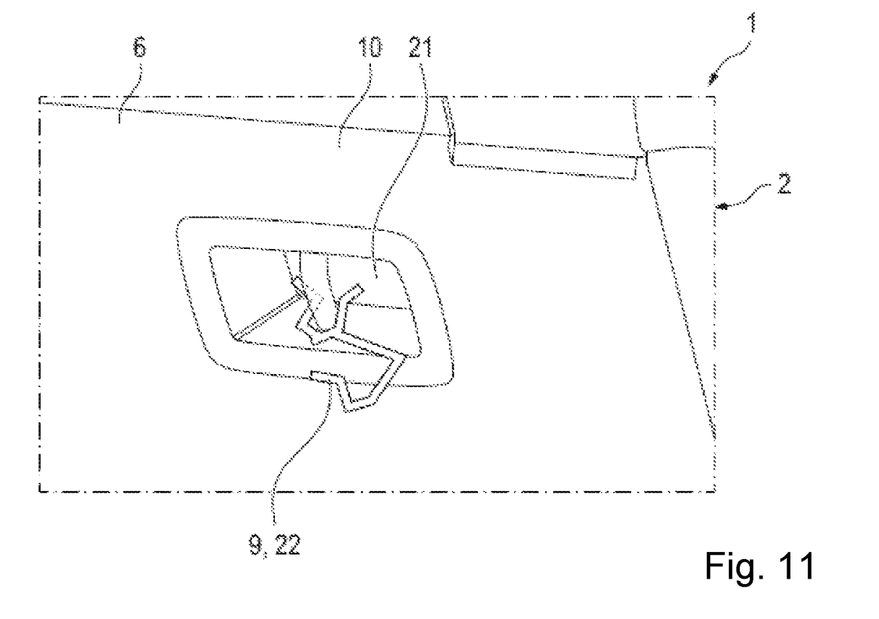

In the fixation device 9 shown in FIG. 11, the latter only comprises a retaining contour 22, which is simultaneously connectable to a lashing ring 21 and the hat shelf 6. The lashing ring 21 is in this case arranged at the rear side 10 of the rear seat bench 2. Via the retaining contour 22, it is also possible to simply hold or bias the hat shelf 6 on the rear side 10 of the rear seat bench 2 when the hat shelf is in its non-usage position.

Figure 9:
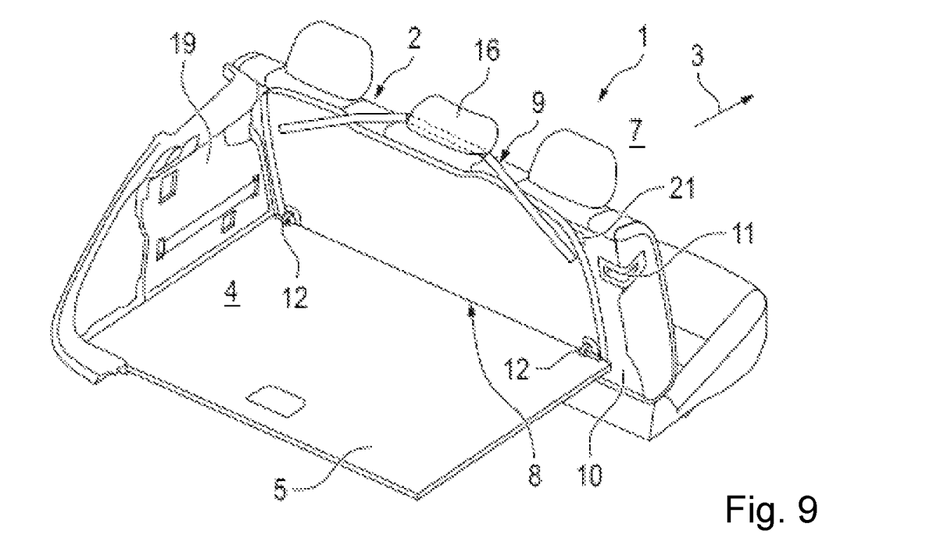
Figure 10:
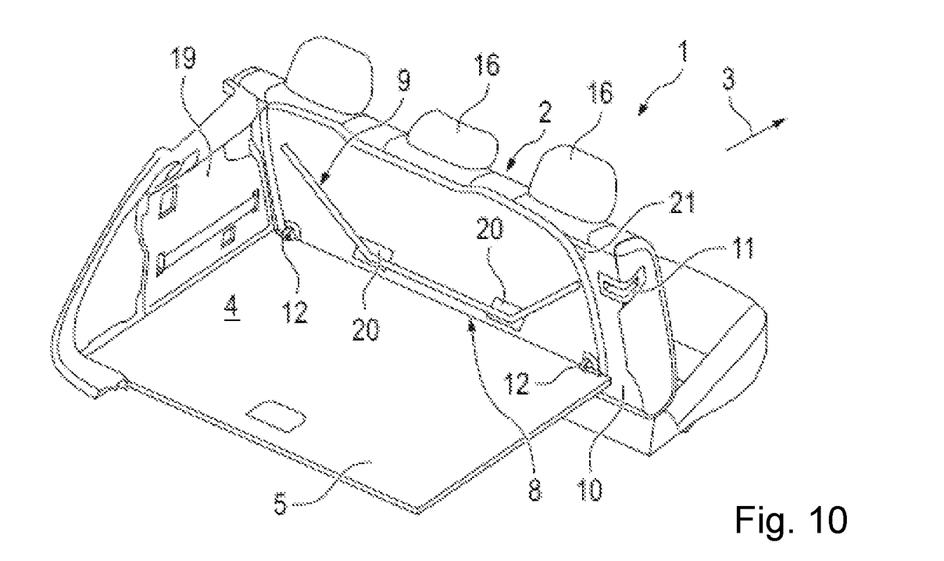

A particularly preferred embodiment of the fixation device 9 is shown in FIGS. 9 and 10, wherein retaining elements 20 are provided on the bottom side of the hat shelf 6, e.g., around which the elastic band 13 of the fixation device 9 can be tensioned when in its non-usage position. To transfer the fixation device 9 into its usage position, as shown in FIG. 9, the elastic band 13 can be arranged around, e.g., a center head support 16 (see FIG. 9).

The retaining elements 20, which are made of, e.g., plastic can in this case be provided purely optionally, so that the fixation device 9 in its non-usage state is tensioned smoothly over the bottom side of the hat shelf 6. In this context, it should be quite clear that a fixation device 9 located in its non-usage position can also be fixed to a lower side of the storage compartment floor 5, as indicated by the dashed line in FIG. 1. An embossment in the storage compartment floor 5 can also be provided for this purpose.

A rear seat bench 2 is repeatedly mentioned in the preceding description of the drawings, wherein it is quite clear that said bench can also be used as a front seat bench or generally as a rear seat bench, a rear seat, or a seating means.

The elastic band 13 can further be releasably attached to or fixedly fixed to the hat shelf 6, e.g., as shown in FIGS. 9 and 10. This releasable attachment can be accomplished via, e.g., hook elements 17 or snaps 18.

Figure 12:
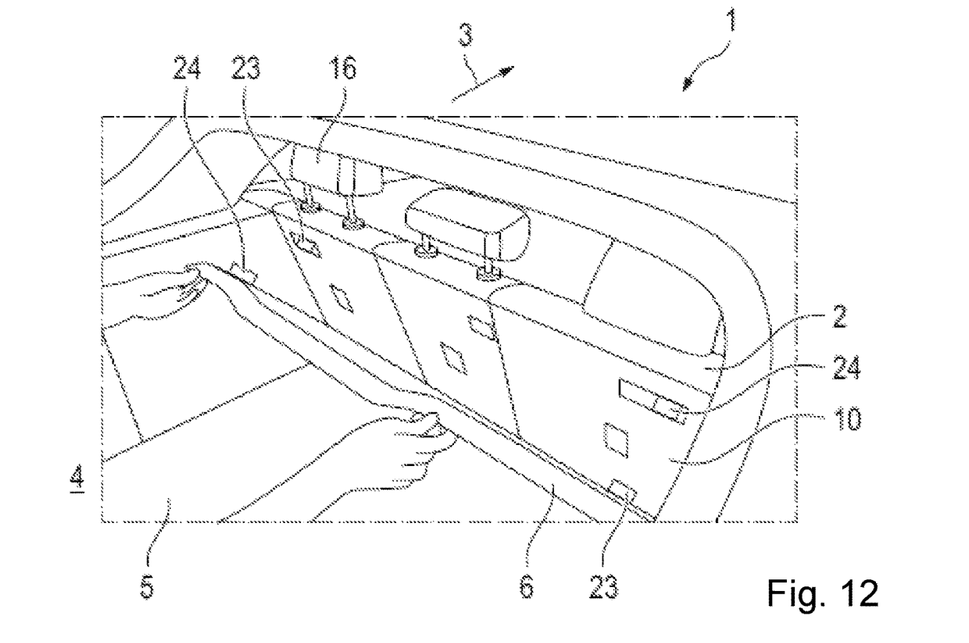

The fixation device 9 can, as shown in FIG. 12, comprise a magnetic element 23 and a ferromagnetic element 24, wherein the magnetic element 23 can be arranged on the hat shelf 6 and the ferromagnetic element 24 on the rear side 10 of the rear seat bench 2, or vice versa.

The magnetic element 23 and the (metallic) ferromagnetic element 24 can either be mounted separately or integrated into the hat shelf 6 or into the rear side 10 of the rear seat bench 2. Such a magnetic element 23 and ferromagnetic element 24 can make a fixation process as well as a release process of the fixation device 9 extremely simple, thus providing a high degree of user convenience.

Figure 13:
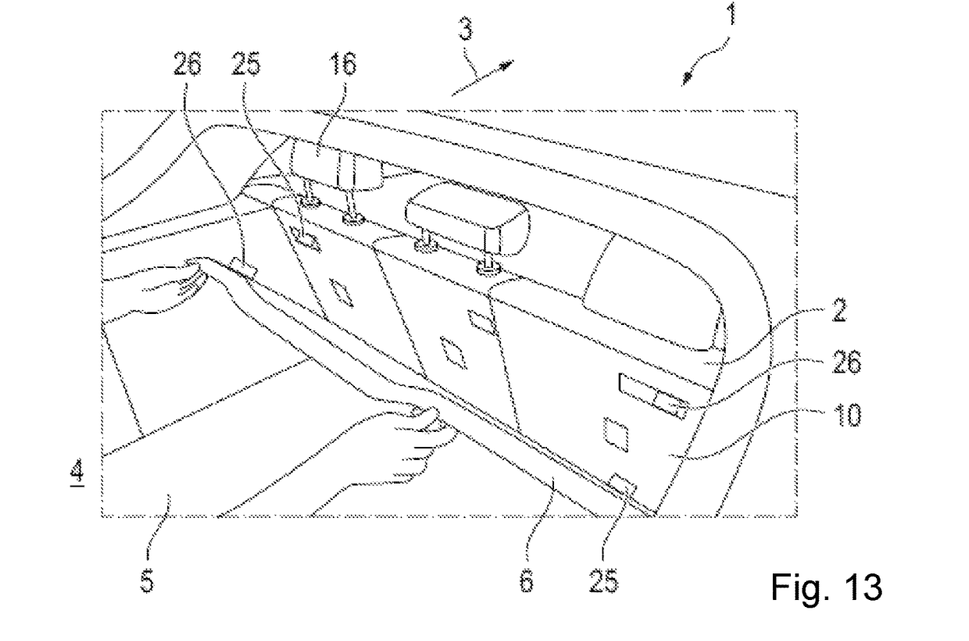

Additionally or alternatively, the fixation device 9 can in particular also comprise a flexible snap fastener band 25 or a hook and loop fastener 26, as shown in FIG. 13. The arrangement in the hook-and-loop fastener 26 can be designed to include either fleece tape on the hat shelf 6 and a hooking tape on the rear seat bench 2, or vice versa. The arrangement with the flexible snap fastener belt 25 in particular is independent, since both halves are the same. Such a snap fastener tape 25 is a releasable fastening system that provides a preferably invisible fastening alternative providing an audible click. The compression tape 25 can comprise small polyolefin hemispherical heads on short stems that compress together to form a solid but releasable joint. The difference between the flexible snap fastener tape 25 and the hook-and-loop fastener 26 is that the connection is created by slight direct pressure in the direction of force through snapping and such that foreign objects cannot be unintentionally involved (e.g., garments, etc.). In general, however, both the particularly flexible snap fastener tape 25 and the hook and loop fastener 26, wide varieties of which are already known, can be designed to be a fixation procedure as well as a release procedure of the fixation device 9, i.e., extremely simple and thus with a high degree of user convenience.

All in all, the motor vehicle 1 according to aspects of the invention enables comparatively simple stowing of the hat shelf 6 in its non-usage position parallel to a rear side 10 of the rear seat bench 2 without the optional hat shelf 6 having to be stored, e.g., outside of the motor vehicle 1. The adjustment of the hat shelf 6 from its usage position into its non-usage position, or vice versa, is also made comparatively easily, as is a simple fixation of the hat shelf in its non-usage position by way of the fixation device 9. In this context, the fixation device 9 can be built in a very inexpensive and constructively simple manner.

What is claimed is:

1. A motor vehicle comprising:
    a rear seat bench,
    a storage compartment arranged behind the rear seat bench in a direction of travel,
    a storage compartment floor of the storage compartment,
    a hat shelf positionable behind the rear seat bench when in a usage position of the hat shelf such that the hat shelf separates a passenger compartment from the storage compartment,
    a gap disposed between the rear seat bench and the storage compartment floor,
    receptacles on the rear side of the rear seat bench, and
    hinge elements on the hat shelf that are insertable into respective receptacles such that the hat shelf is rotatable relative to the rear seat bench about the hinge elements,
    wherein the hat shelf and the gap interact with one another such that the hat shelf is configured to be inserted into the gap when in a non-usage position of the hat shelf and the hat shelf is configured to be fixed to the rear seat bench via a fixation device such that the hat shelf adjoins a rear side of the rear seat bench when the hat shelf is in the non-usage position, and
    wherein the hinge elements form a stop on the hat shelf when the hat shelf is inserted into the gap,
    wherein the stop on the hat shelf is sized to overlap the gap such that the stop bears on an edge of the storage compartment floor in the non-usage position.

2. A motor vehicle comprising:
    a rear seat bench,
    a storage compartment arranged behind the rear seat bench in a direction of travel,
    a storage compartment floor of the storage compartment,
    a hat shelf positionable behind the rear seat bench when in a usage position of the hat shelf such that the hat shelf separates a passenger compartment from the storage compartment, and
    a gap disposed between the rear seat bench and the storage compartment floor,
    wherein the hat shelf and the gap interact with one another such that the hat shelf is configured to be inserted into the gap when in a non-usage position of the hat shelf and the hat shelf is configured to be fixed to the rear seat bench via a fixation device such that the hat shelf adjoins a rear side of the rear seat bench when the hat shelf is in the non-usage position,
    wherein the fixation device comprises an elastic band having a first fixation element and a second fixation element, the longitudinal ends of which are attached to the elastic band, wherein the first fixation element and the second fixation element are fixable or firmly fixed to the hat shelf, while the elastic band wraps around a head support of the rear seat bench and thereby biases the hat shelf against the rear side of the rear seat bench when the hat shelf is in the non-usage position.

3. The motor vehicle according to claim 2, wherein the first fixation element or the second fixation element is a hook or a snap.

4. The motor vehicle according to claim 1, wherein the fixation device comprises an elastic band having a first fixation element and a second fixation element, the longitudinal ends of which are attached to the elastic band, wherein the first fixing element is fixable or firmly fixed to the hat shelf, while the second fixing element is connected to a rod of a head support, thereby biasing the hat shelf against the rear side of the rear seat bench when the hat shelf is in its non-usage position.

5. The motor vehicle according to claim 1, wherein, in the non-usage position, the fixation device is configured to be fixed to a bottom side of the hat shelf and/or to a side wall of the storage compartment.

6. The motor vehicle according to claim 1, further comprising lashing rings on the rear side of the rear seat bench, and wherein the fixation device comprises a retaining contour that is configured to be connected to one of the lashing rings and the hat shelf and thereby retain the hat shelf at the rear side of the rear seat bench when the hat shelf is in the non-usage position.

7. A motor vehicle comprising:
    a rear seat bench,
    a storage compartment arranged behind the rear seat bench in a direction of travel,
    a storage compartment floor of the storage compartment,
    a hat shelf positionable behind the rear seat bench when in a usage position of the hat shelf such that the hat shelf separates a passenger compartment from the storage compartment,
    a gap disposed between the rear seat bench and the storage compartment floor, and
    lashing rings on the rear side of the rear seat bench, and wherein the fixation device comprises a retaining contour that is configured to be connected to one of the lashing rings and the hat shelf and thereby retain the hat shelf at the rear side of the rear seat bench when the hat shelf is in the non-usage position,
    wherein the hat shelf and the gap interact with one another such that the hat shelf is configured to be inserted into the gap when in a non-usage position of the hat shelf and the hat shelf is configured to be fixed to the rear seat bench via a fixation device such that the hat shelf adjoins a rear side of the rear seat bench when the hat shelf is in the non-usage position,
wherein the retaining contour wraps around an edge of the hat shelf.

8. The motor vehicle according to claim 1, wherein the fixation device comprises a magnetic element and a ferromagnetic element, and/or the fixation device comprises a snap fastener tape or a hook-and-loop fastener.

\* \* \* \* \*